(12) United States Patent
Mellor (10) Patent No.: US 10,137,996 B2
(45) Date of Patent: Nov. 27, 2018

(54) POSITIVE LOCK LATCHING MECHANISM

(71) Applicant: The Boeing Company, Chicago, IL (US)

(72) Inventor: Mitchell L. R. Mellor, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 710 days.

(21) Appl. No.: 14/726,444

(22) Filed: May 29, 2015

(65) Prior Publication Data

US 2016/0347465 A1    Dec. 1, 2016

(51) Int. Cl.
*B64D 29/06* (2006.01)
*E05B 41/00* (2006.01)
*E05C 19/14* (2006.01)

(52) U.S. Cl.
CPC .............. *B64D 29/06* (2013.01); *E05B 41/00* (2013.01); *E05C 19/145* (2013.01); *E05C 19/14* (2013.01); *Y10S 292/49* (2013.01)

(58) Field of Classification Search
CPC ....... Y10S 292/49; E05C 19/14; E05C 19/145
USPC .............................. 292/109, 110, 113, 256.69
See application file for complete search history.

(56) References Cited

U.S. PATENT DOCUMENTS

| | | | |
|---|---|---|---|
| 2,703,431 A * | 3/1955 | Tatom | E05C 19/145 16/258 |
| 2,712,955 A * | 7/1955 | Andrews | E05C 19/145 244/129.4 |
| 3,259,412 A * | 7/1966 | Wheeler | E05C 19/145 292/113 |
| 3,347,578 A | 10/1967 | Sheehan et al. | |
| 4,531,769 A | 7/1985 | Glancy | |
| 4,679,750 A | 7/1987 | Burhans | |
| 5,915,765 A * | 6/1999 | Sternberger | B64D 29/06 24/270 |
| 6,036,238 A * | 3/2000 | Lallament | B64D 29/06 292/100 |
| 6,325,428 B1 * | 12/2001 | Do | B64D 29/06 244/129.4 |
| 6,343,815 B1 * | 2/2002 | Poe | E05C 19/145 292/113 |
| 7,066,501 B2 * | 6/2006 | Meineke | B64D 29/06 244/129.4 |

FOREIGN PATENT DOCUMENTS

FR              981093 A *  5/1951  ........... E05C 19/145

* cited by examiner

*Primary Examiner* — Carlos Lugo
(74) *Attorney, Agent, or Firm* — Haynes and Boone, LLP (57) ABSTRACT

An apparatus and method according to one or more embodiments are provided for a latching mechanism. The latching mechanism may be implemented, for example, as a positive lock latching mechanism that provides a positive indication when a latch is not engaged. In one example, an apparatus includes a latch arm comprising a slotted hole and a latch hook configured to engage a pin. The latch includes a bifold handle coupled to the latch arm, the bifold handle comprising a first handle portion and a handle extension portion, wherein the first handle portion comprises a lock hook configured to translate through the slotted hole to engage the pin and the handle extension portion is configured to move away from the first handle portion when the lock hook is not engaged with the pin. Additional systems and methods are also provided.

20 Claims, 13 Drawing Sheets

POSITIVE LOCK LATCHING MECHANISM

TECHNICAL FIELD

The invention relates generally to latching mechanisms for hinged structures and, more particularly, for example, to latching mechanisms used on modern airline engine fan cowls.

BACKGROUND

In the field of latching mechanisms such as for modern aircraft, there is an ongoing effort to assure that structures required to be latched are properly latched prior to flight. During normal operation, hinged structures are unlatched and opened to provide access by operators and ground support personnel. The structures need to be closed and securely latched prior to flight operation. Conventional latching mechanisms provide a latch and latch handle to engage and latch hinged structures. Further, conventional latches lock the latch handle to the latch such that the latch handle can be folded flush with an exterior surface of the hinged structure. If a latch is not properly latched, the latch handle may protrude from the exterior surface of the hinged structure to provide an indication to an operator the latch is not secured. However, the handle may not be visible to an operator due to line of sight restrictions relative to the latch. Further, a latch handle may be secured while the latch itself is not properly engaged with the mating structure.

Thus, there is a need for a latch mechanism that provides a high degree of visibility when the latch mechanism is not fastened so that an unfastened or un-latched condition can be easily detected. Further, there is a need to provide a positive indication that the latch is properly engaged.

SUMMARY

Systems and methods are disclosed herein in accordance with one or more embodiments that provide an improved approach to latching modern airliner engine fan cowls and providing a positive indication the latch mechanism is closed. In some embodiments, a latch is implemented with a latch arm pivotally secured to a first cowl configured to engage a pin on a second cowl. In one example, a slotted hole is formed in the latch arm to allow a lock hook to freely translate through the slotted hole to engage the pin. The lock hook is coupled to a bifold handle and configured such that the bifold handle will not close until the lock hook is engaged on the pin. A handle extension moves away such that it is easily visible by an observer when the latch hook is not engaged with the pin.

In one embodiment, a latch includes a latch arm comprising a slotted hole and a latch hook configured to engage a pin; and a bifold handle coupled to the latch arm, the bifold handle comprising a first handle portion and a handle extension portion, wherein the first handle portion comprises a lock hook configured to translate through the slotted hole to engage the pin and the handle extension portion is configured to move away from the first handle portion when the lock hook is not engaged with the pin.

In another embodiment, a method of using a latch includes moving a latch arm from a first position to a second position; securing the latch arm at the second position; moving a first handle member from a third position to the second position; securing the first handle member at the second position, wherein securing the first handle member comprises moving a catch pin from a resting position to a center position; and moving a handle extension member into a secured position adjacent to the first handle member.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Conventional latching mechanisms provide a latch and a latch handle to engage and latch engine fan cowls. Conventional latches may lock the latch handle to the latch such that the latch handle can be closed and locked without actually fastening the two engine fan cowls together.

Further, existing engine fan cowl latches provide limited visual indication of the latch condition. A conventional closed latch that is not fastened may protrude only 1 or 2 inches. Latches on the bottom of the engine fan cowl of airplanes with low slung engines do not protrude enough to be visible by an observer near the engine due to the curvature of the engine fan cowl.

As set forth above, these approaches fail to provide an indication a latch is not properly secured resulting in an open engine fan cowl. A latching mechanism is described herein that provides a positive indication that a latch is properly secured and a visible indication when the latch is not properly secured.

Figure 1:
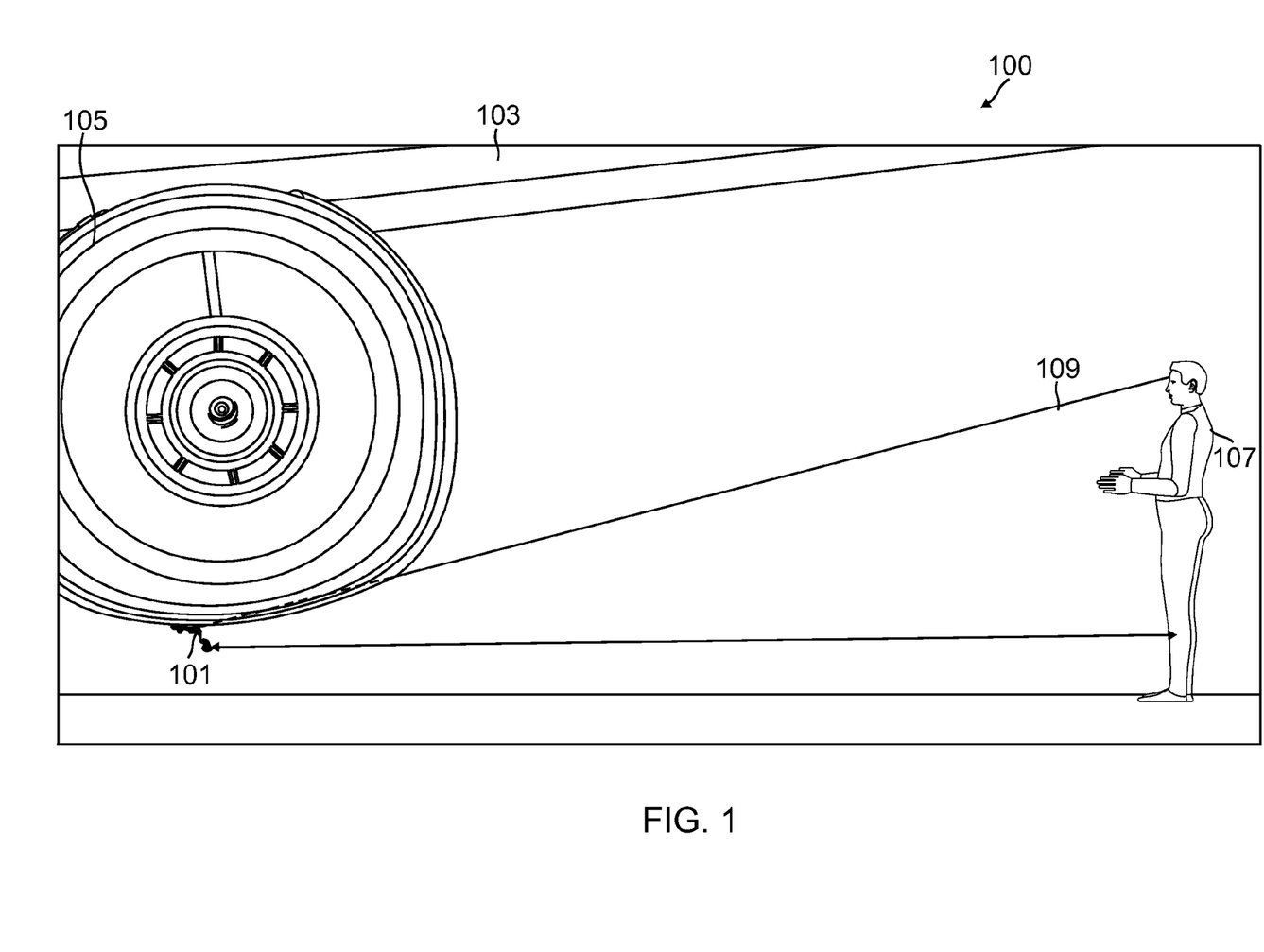
FIG. 1 illustrates a line of sight view of a latch on an engine fan cowl in accordance with an embodiment of the disclosure.

FIG. 1 illustrates a line of sight view of a latch on an engine fan cowl 100 in accordance with an embodiment of the disclosure. In FIG. 1, a latch 101 is shown in an unlatched condition. Latch 101 is used to secure a pair of hinged cowls covering an engine 105. Engine 105 is secured to a wing 103. FIG. 1 illustrates that an observer 107 is unable to view latch 101 in an unlatched condition at a line of sight 109 (e.g., line of sight of conventional latch handles) due to the curvature of engine 105. Thus, low slung engines such as engine 105 require a longer handle than that provided by conventional latches in order to be detected by observer 107 when the latch is not properly latched. Positive lock latching mechanism, latch 102 (not shown) includes a longer handle such that an unlatched condition may easily be detected.

Figure 2:
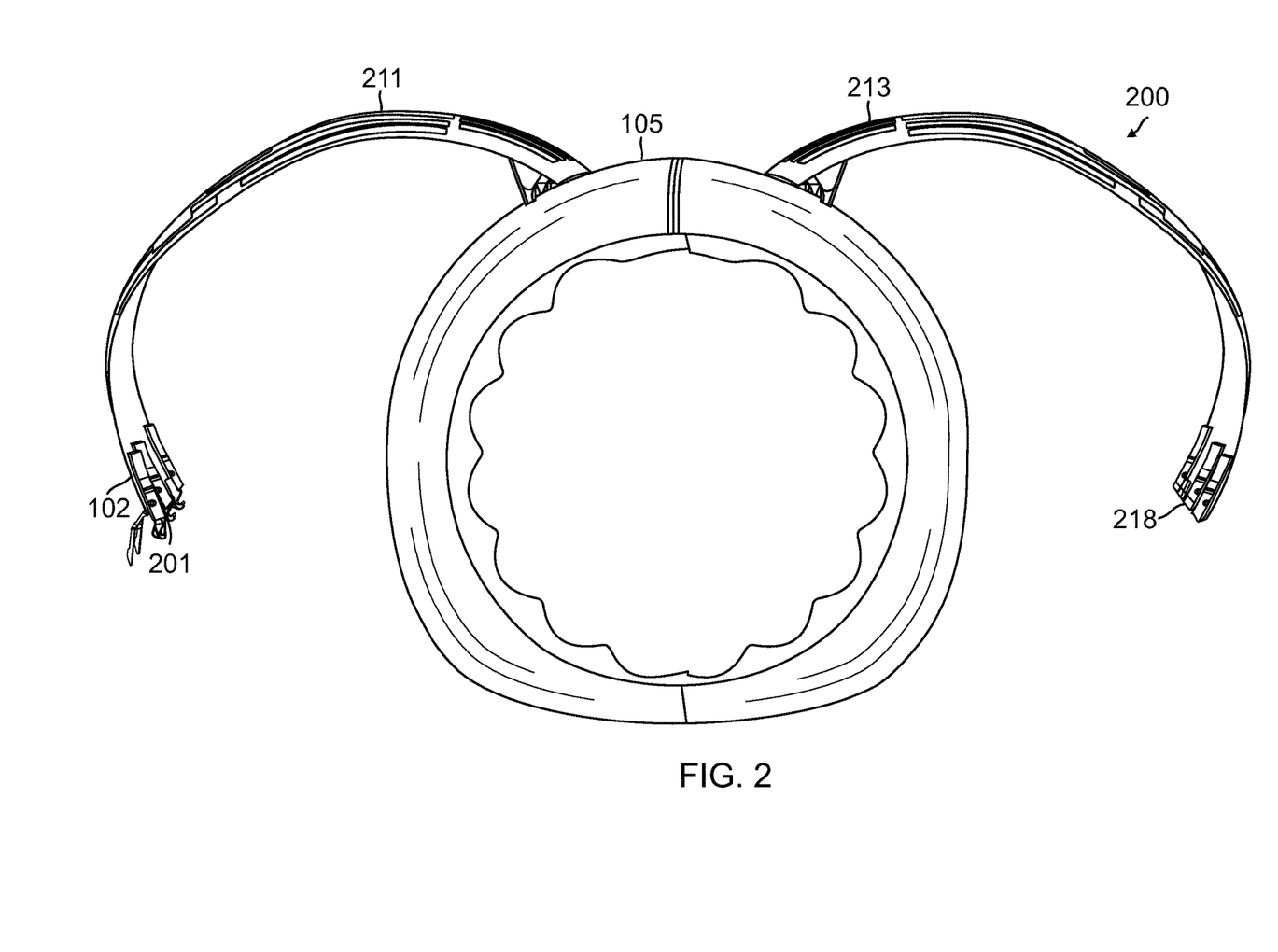
FIG. 2 illustrates engine fan cowls mounted to an engine in accordance with an embodiment of the disclosure.

FIG. 2 illustrates engine fan cowls mounted to an engine 200 in accordance with an embodiment of the disclosure. In FIG. 2, engine 105 is shown with two adjacent hinged engine fan cowls 211 and 213 secured to engine 105. Engine fan cowl 211 and engine fan cowl 213 are shown in an open position. A plurality of latches 102 may be secured to engine fan cowl 211 near a mating surface 201. Latches 102 may be used to latch engine fan cowl 211 and engine fan cowl 213 together at mating surface 201 and mating surface 218 when they are moved to a closed position at a bottom surface of engine 105.

Figure 3A:
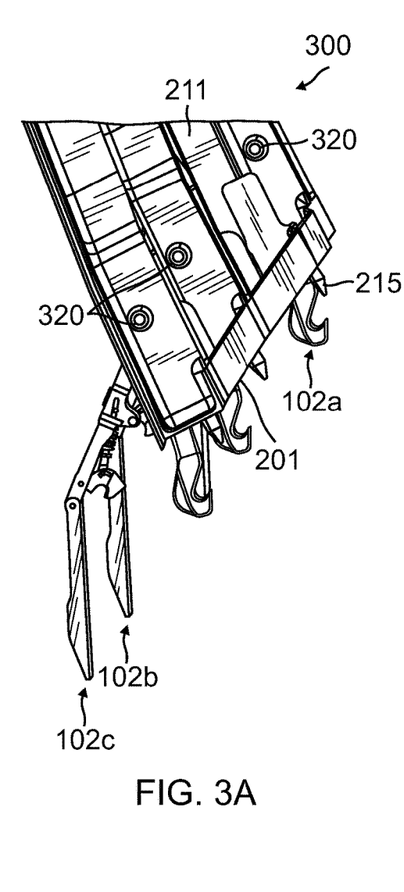
FIGS. 3A and 3B illustrate perspective views of latches secured to an engine fan cowl in accordance with embodiments of the disclosure.

FIG. 3A illustrates an inside view of an engine fan cowl 300 in accordance with an embodiment of the disclosure. In FIG. 3A, an inside view of engine fan cowl 211 is shown with three latches (e.g., 102a, 102b and 102c). Latches 102a, 102b and 102c are shown secured to engine fan cowl 211 by fastener bolts 320. Latches 102 may be secured to engine fan cowl 211 near mating surface 201. Cowl guide pins 215 may be located near each latch 102 to aid in positioning the mating surfaces of engine fan cowl 211 and engine fan cowl 213 when latching.

Figure 3B:
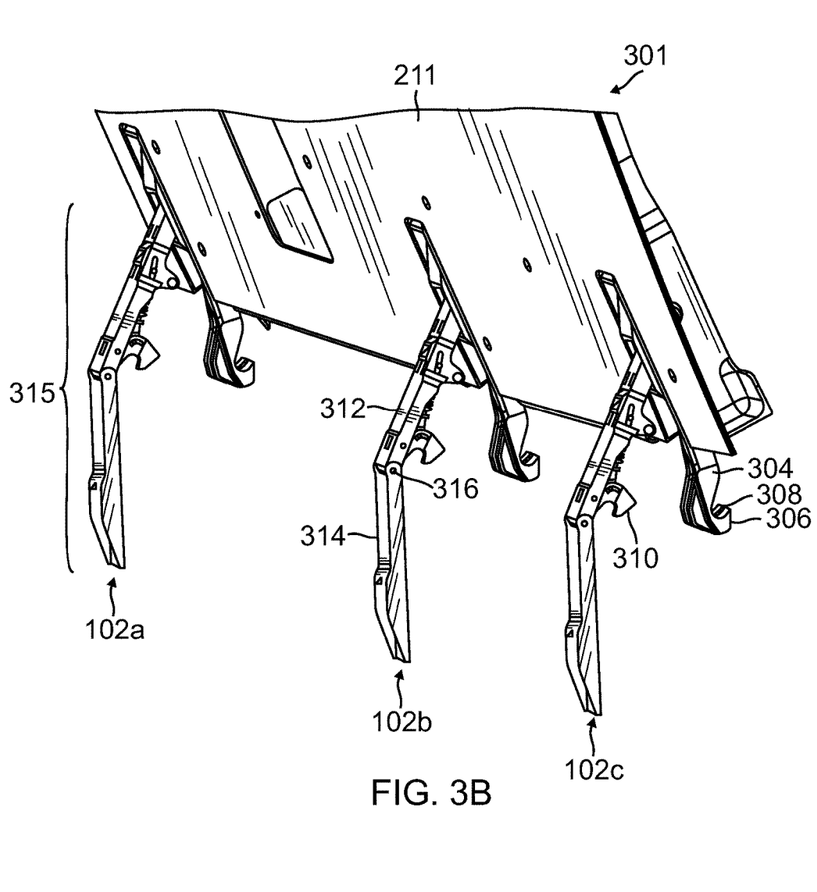

FIG. 3B illustrates an outside view of an engine fan cowl 301 in accordance with an embodiment of the disclosure. FIG. 3B illustrates engine fan cowl 211 including latches 102a, 102b and 102c secured to engine fan cowl 211. Latch 102 includes a latch arm 304 and a bifold handle 315.

Latch arm 304 includes a latch hook 306 and a slotted hole 308 formed within latch arm 304. Latch hook 306 is located on an end of latch arm 304 and is formed on a top surface of latch arm 304 to engage a pin 424 (see FIG. 4). Slotted hole 308 may be formed within latch arm 304 from a first side of latch hook 306 through to a second side of latch hook 306. Slotted hole 308 is elongated to allow a lock hook 310 to pass through slotted hole 308.

Bifold handle 315 includes a first handle portion 312 and a handle extension portion 314. First handle portion 312 includes lock hook 310. In some embodiments, lock hook 310 may be secured on a first end of first handle portion 312 such that when first handle portion 312 is moved toward latch arm 304, lock hook 310 translates through slotted hole 308 to engage pin 424. In other embodiments, lock hook 310 may translate adjacent to latch arm 304 to engage pin 424.

Handle extension portion 314 may be pivotally coupled to first handle portion 312 at handle extension coupling 316. Handle extension portion 314 includes one open side to fold adjacent to first handle portion 312. Handle extension portion 314 may move (e.g., rotate) toward first handle portion 312 to a secure position when latch 102 is engaged. Handle extension portion 314 may move away from first handle portion 312 when latch 102 is not engaged. Bifold handle 315 is shown moved away from latch arm (when latch 102 is not engaged) in FIG. 3B. In some embodiments, handle extension portion 314 rotates to a secured position. However, other embodiments are possible where handle extension portion 314 may slide into a secure position when latch 102 is engaged.

Figure 4:
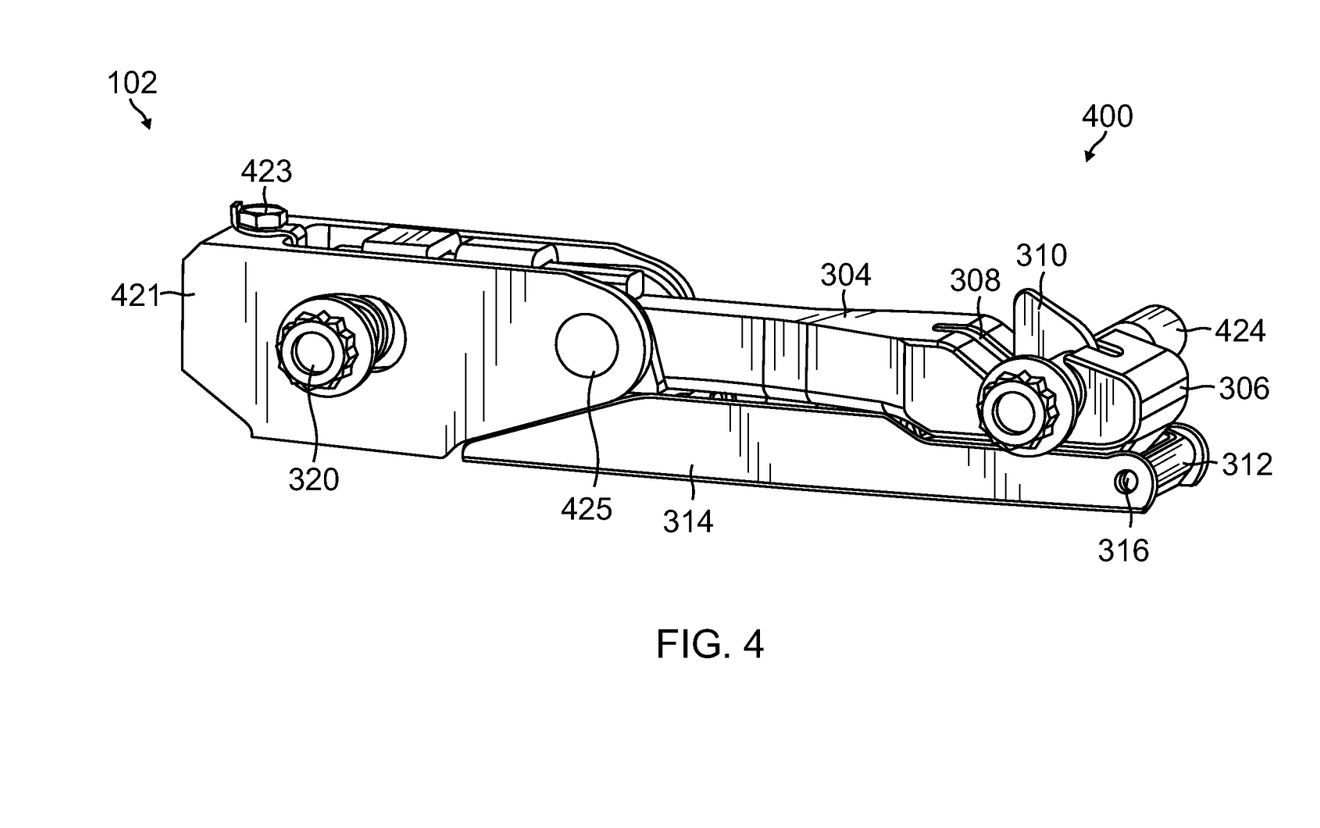
FIG. 4 illustrates an engaged latch in accordance with an embodiment of the disclosure.

FIG. 4 illustrates an engaged latch 400 in accordance with an embodiment of the disclosure. In FIG. 4, latch 102 is engaged with pin 424. Latch 102 may be pivotally secured to a first cowl member by cowl fastener bolt 320 (see FIG. 3). Pin 424 may be physically secured to a second cowl member. Latch hook 306 is shown engaged with pin 424. Lock hook 310 is positioned through slotted hole 308 and engaged with pin 424. In this regard, lock hook 310 translates through slotted hole 308 to engage pin 424.

Handle extension portion 314 is shown in a secured position. In this regard, handle extension portion 314 may fold in (e.g., rotates or moves) at handle extension coupling 316 adjacent to first handle portion 312 when lock hook 310 is engaged with pin 424.

Additional elements included are an adjustment nut lock fastener 423 used to secure adjustment nut 562 after selectively adjusting a latch 102 preload, as described herein. Further, a latch body 421 pivotally secures a double hinged lever 528 (see FIG. 5) at a latch body mount 425.

Figure 5:
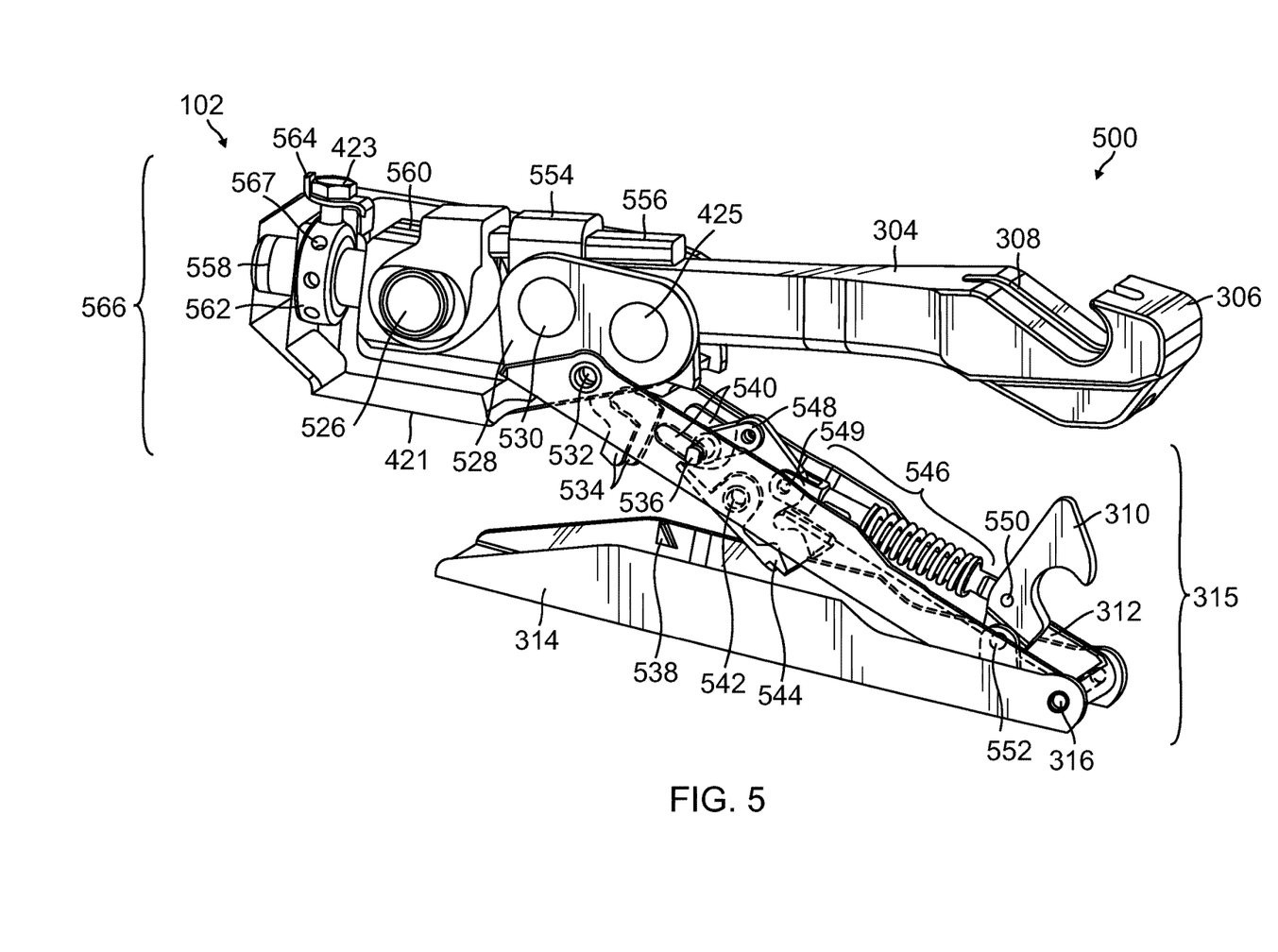
FIGS. 5 and 6 illustrate inside views of a latch in accordance with embodiments of the disclosure.
Figure 6:
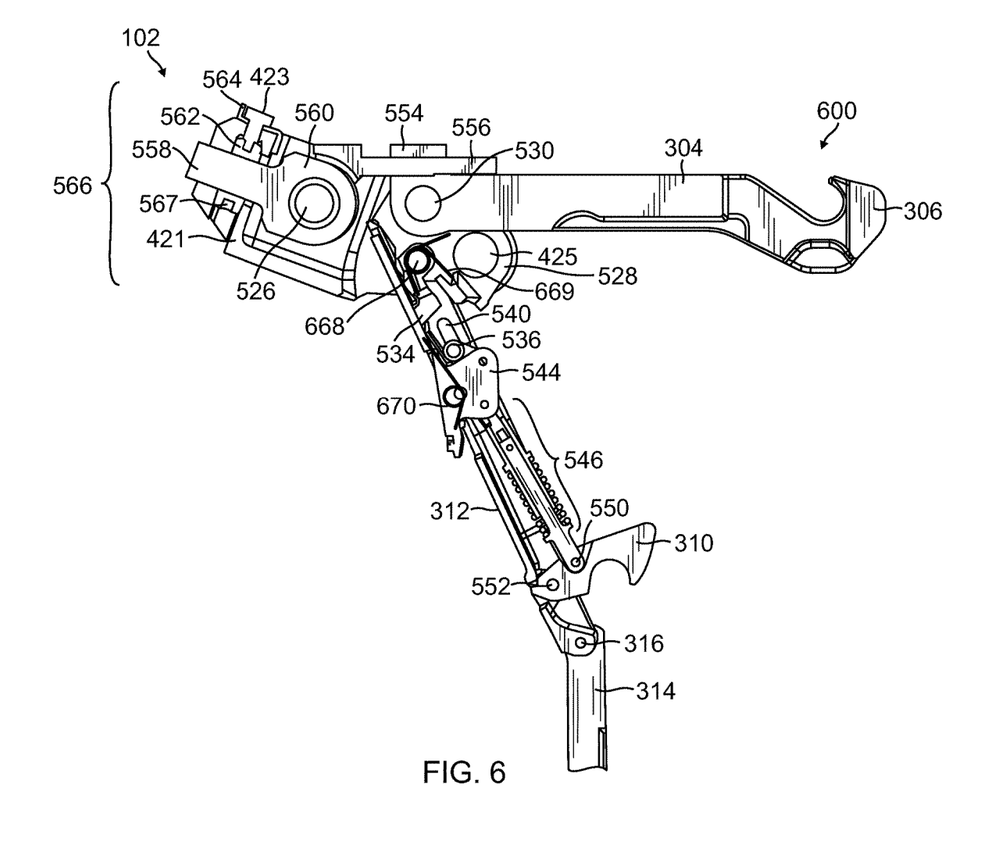

FIGS. 5 and 6 illustrate inside views of a latch in accordance with embodiments of the disclosure. FIG. 5 provides an inside view of latch 102. FIG. 6 also provides an inside view of latch 102 with additional elements discussed herein. These views aid in illustrating an embodiment of the disclosure and the detailed discussion herein may refer to these views and elements contained within these views.

FIG. 5 illustrates latch 102 with partially folded bifold handle 315 and latch arm 304. Bifold handle 315 includes a first end of first handle portion 312 coupled to latch arm 304 at first handle attach through hole 532. When first handle portion 312 rotates at a first handle attach through hole 532 from a latch 102 open position, it may exert a force on a double hinged lever 528 at a latch arm mount 530 to move latch arm 304 toward pin 424. A latch arm guide 556 guides latch arm 304 at a latch arm guide hole 554, formed as part of latch arm 304. As first handle portion 312 further rotates, latch hook 306 may be pulled over pin 424 to move a first cowl toward a second cowl. Latch 102 may be pivotally secured to a cowl at latch through hole 526. A latch body 421 pivotally secures a double hinged lever 528 at a latch body mount 425.

Lock hook 310 may be coupled to first handle portion 312 at lock hook pivotal connection 552. As first handle portion 312 moves toward pin 424, lock hook 310 translates through slotted hole 308 and may be pushed over pin 424 to engage pin 424. Lock hook 310 may be coupled to lock hook spring and linkage 546 at lock hook attach pin 550. Linkage portion of lock hook spring and linkage 546 may limit travel of lock hook 310 by a stop located near lock hook spring connection 550.

As lock hook 310 moves, lock hook spring and linkage 546 translate longitudinally relative to lock hook 310. Spring portion of lock hook spring and linkage 546 may hold lock hook 310 in a resting (e.g., closed or forward) position when lock hook 310 is not engaged with pin 424. Linkage portion of lock hook spring and linkage 546 may be coupled to a latch release button 544 at coupling 549. Latch release button 544 may be secured to first handle portion 312 at a pivotal coupling 542. Latch release button 544 may be coupled to a catch pin 536 at a catch pin linkage 548.

Catch pin 536 may be a rod traversing first handle portion 312 and may translate longitudinally along a long side of first handle portion 312 through elongated slotted holes 540. Slotted hole 540 may be formed on two sides of first handle portion 312. Other embodiments may include only one slotted hole or multiple slotted holes. Catch pin 536 moves along slotted hole 540 relative to lock hook 310.

The movement of lock hook 310 and catch pin 536 position lock hook 310 relative to first handle portion 312. When lock hook 310 engages pin 424, pin 424 may move lock hook 310. Lock hook 310 may have an angled lead designed to contact pin 424 and facilitate engaging pin 424 by providing a force to move lock hook 310 to a position where pin 424 may contact the inner radius of lock hook 310. In some embodiments, lock hook 310 may move catch pin 536 to one of a plurality of positions within slotted hole 540. In certain such embodiments, lock hook 310 may move catch pin 536 to one of three positions. The three positions of catch pin 536 are resting, center and release. Lock hook 310 may move catch pin 536 to the resting and center positions. Engagement of a latch release button 544 may move catch pin 536 to the release position. When latch release button 544 is depressed, lock hook 310 disengages with pin 424 and catch pin 536 moves to the release position.

Bifold handle 315 may include a second end of first handle portion 312 coupled to handle extension portion 314 at handle extension coupling 316. Handle extension portion 314 provides for visual indication that lock hook 310 is not engaged with pin 424. In this regard, handle extension portion 314 includes a handle catch 538 fixedly attached to both sides of handle extension portion 314. Handle catch 538 may contact catch pin 536 in a locked position to prevent handle extension portion 314 from moving away from first handle portion 312. In this regard, catch pin 536 translates to contact handle catch 538 in the locked position when lock hook 310 is engaged with pin 424 to keep handle extension portion 314 adjacent to first handle portion 312. Further, catch pin 536 may translate away from handle catch 538 or be in the resting position when lock hook 310 is not engaged with pin 424 to allow handle extension portion 314 to move away from first handle portion 312. Handle extension portion 314 is forced away from first handle portion 312 by handle extension tensioner 534.

Latch 102 includes a latch adjustment mechanism 566. Latch adjustment mechanism 566 includes a latch spindle 560, a latch spindle threaded shaft 558, an adjustment nut 562 including threaded holes 567 spaced around the perimeter of adjustment nut 562, a tab lock washer 564 and an adjustment nut lock fastener 423. As further discussed herein, latch adjustment mechanism 566 is used to selectively adjust a preload of latch 102.

In FIG. 6, latch 102 includes a first handle spring mechanism 669 to apply a force to first handle portion 312 to move first handle portion 312 relative to latch arm 304 when lock hook 310 is not engaged with pin 424. In this regard, first handle spring mechanism 669 may be a coil spring positioned on a first end at a ledge protrusion on double hinged lever 528 and positioned on a second end at the inside base of first handle portion 312. Other embodiments may substitute other force applying devices, such as leaf springs, bushings, torsion bars, tension springs, etc. in place of coil springs. Handle spring mechanism 669 maintains first handle portion 312 in tension to force first handle portion 312 to move away from latch arm 304 unless lock hook 310 is engaged with pin 424. Latch hook 306 also engages pin 424.

Lock hook 310 may be coupled to first handle portion 312 at lock hook pivotal connection 552. Lock hook 310 may be coupled to lock hook spring and linkage 546 at lock hook attach pin 550. Lock hook 310 may move catch pin 536 to one of a plurality of positions within slotted hole 540 as discussed herein.

Latch 102 includes a handle extension spring mechanism 668 to apply a force to handle extension portion 314 to move handle extension portion 314 relative to first handle portion 312 when lock hook 310 is not engaged with pin 424. Handle extension spring mechanism 668 may be a coil spring positioned on a first end at a bottom surface of latch arm 304 near latch arm mount 530 and positioned on a second end at handle extension tensioner 534. Handle extension spring mechanism 668 maintains a force on handle extension tensioner 534. Handle extension tensioner 534 may be pivotally secured to first handle portion 312 at a top surface and extends through a slotted hole in first handle portion 312 to contact a top surface of handle extension portion 314. Handle extension portion 314 is forced away from first handle portion 312 by handle extension tensioner 534. In this regard handle extension portion 314 pivotally rotates away from first handle portion 312 at handle extension coupling 316. In certain embodiments, two or more handle extension spring mechanisms 668 and two or more handle extension tensioners 534 may be used, each located at the top surface of first handle portion 312. In other embodiments, handle extension spring mechanism 668 may be used to force handle extension portion 314 away from first handle portion 312.

Latch release button 544 includes a latch release spring 670. In some embodiments, latch release spring 670 may be a coil spring positioned on a first end at latch release button 544 and positioned on a second end at first handle portion 312. In other embodiments, latch release spring 670 may be a tension or a compression spring.

Latch 102 includes a latch adjustment mechanism 566 contained within latch body 421. Latch adjustment mechanism 566 includes a latch spindle 560, a latch spindle threaded shaft 558, an adjustment nut 562 including threaded holes 567 spaced around the perimeter of adjustment nut 562, a tab lock washer 564 and an adjustment nut lock fastener 423. As further discussed herein, latch adjustment mechanism 566 may be used to selectively adjust a preload of latch 102 by changing the distance between fastener bolt 320 and pin 424. Latch 102 may be pivotally secured to a cowl at latch through hole 526.

Also included are latch arm guide 556 and latch arm guide through hole 554. Latch arm guide 556 guides latch arm 304 through latch arm guide hole 554 as latch arm 304 moves (e.g., to engage pin 424). Further, a latch body 421 pivotally secures a double hinged lever 528 at a latch body mount 425.

Figure 7A:
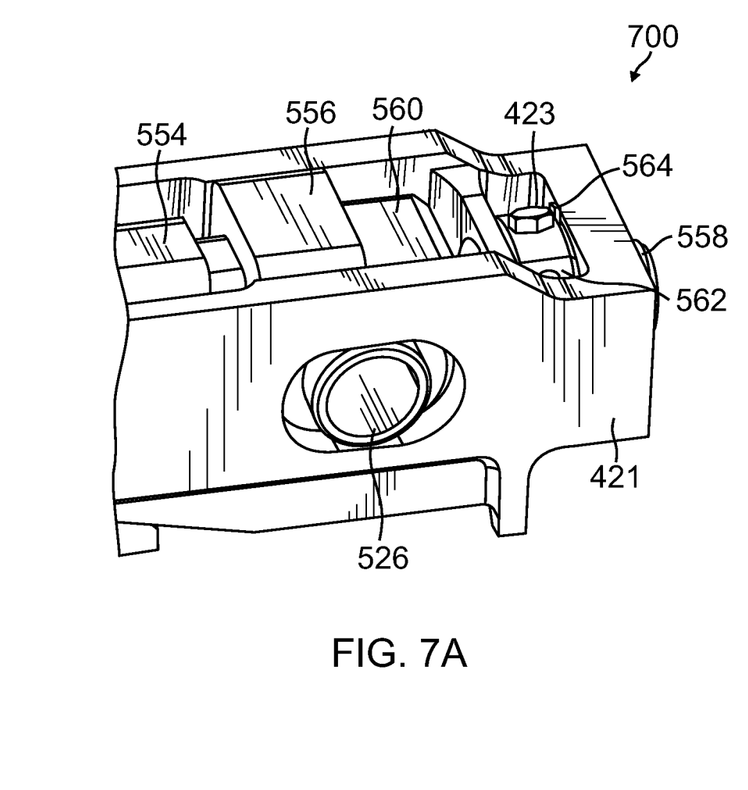
FIG. 7A illustrates a view of an adjustment mechanism of a latch in accordance with an embodiment of the disclosure.
Figure 7B:
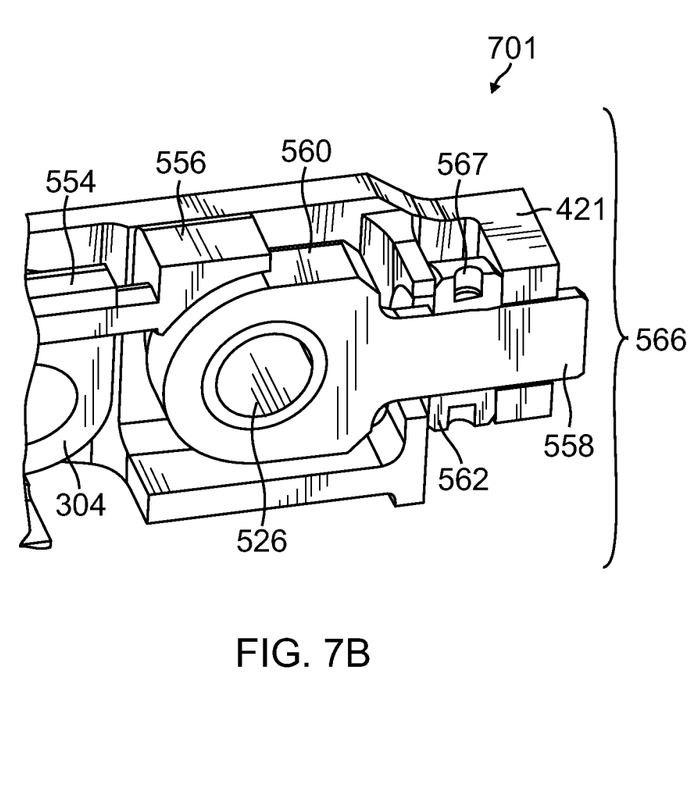
FIG. 7B illustrates a cutaway view of an adjustment mechanism of a latch in accordance with an embodiment of the invention.

FIG. 7A illustrates a view of an adjustment mechanism of a latch 700 in accordance with an embodiment of the disclosure. FIG. 7B illustrates a cutaway view of an adjustment mechanism of a latch 701 in accordance with an embodiment of the invention. These views aid in illustrating an embodiment of the disclosure and the detailed discussion herein may refer to these views and elements contained within these views.

Latch adjustment mechanism 566 applies a selectable preload to latch 102 by adjusting the position of latch body 421 relative to latch through hole 526. Latch adjustment mechanism 566 is formed as an integral part of latch body 421. Latch body 421 with latch adjustment mechanism 566 is pivotally secured to a cowl at latch through hole 526, latch through hole 526 may be formed within latch spindle 560. In this regard, as adjustment nut 562 is turned on latch spindle threaded shaft 558, latch body 421 moves relative to latch through hole 526. Additionally, such a configuration allows the effective length of latch arm 304 (i.e., the distance between the latch hook 306 and the fastener bolt 320, both not shown) to be adjusted without adjusting the effective length of the first handle portion 312 (i.e., the distance between lock hook 310 and fastener bolt 320). Adjustment may be performed when latch arm 304 is engaged with pin 424. Thus, as adjustment nut is turned, latch 102 moves to preload or change the preload of latch arm 304 on pin 424. In some embodiments, adjustment nut 562 may include one or more holes 567 spaced around the perimeter of adjustment nut 562. In other embodiments, spline teeth may be oriented around an outside diameter of adjustment nut 526. An adjustment nut lock fastener 423 and a tab lock washer 564 may be used to secure adjustment nut 562 to set and/or keep a preload. In certain embodiments, lock wire or a friction locking device may be used to secure adjustment nut 526. In other embodiments, adjustment nut 562 may include detents to receive a ball lock or other mechanical retention features.

In certain embodiments where a preload is not required, latch body 421 may be pivotally connected to fastener bolt 320.

Also included are latch arm guide 556 and latch arm guide through hole 554. Latch arm guide 556 guides latch arm 304 through latch arm guide hole 554 as latch arm 304 moves (e.g., to engage pin 424).

Figure 8A:
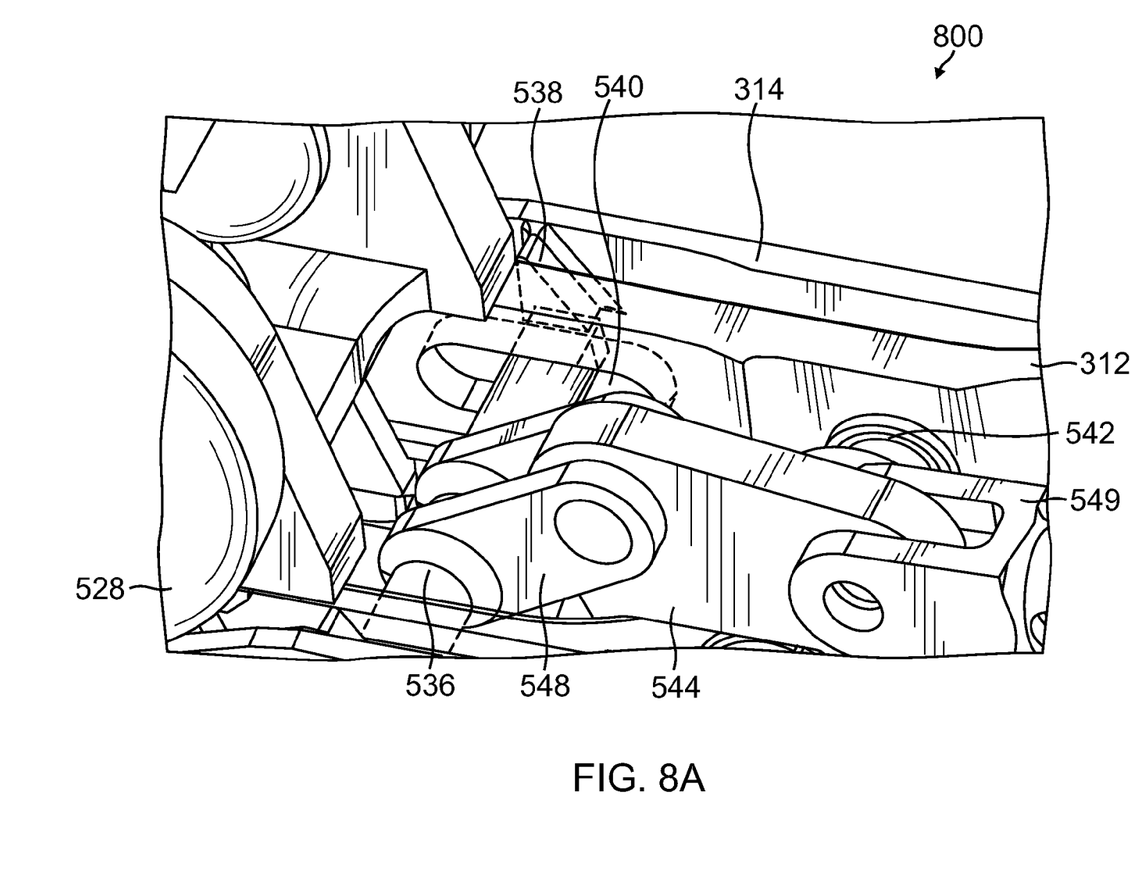
FIGS. 8A and 8B illustrate a catch pin mechanism of a latch in accordance with embodiments of the disclosure.
Figure 8B:
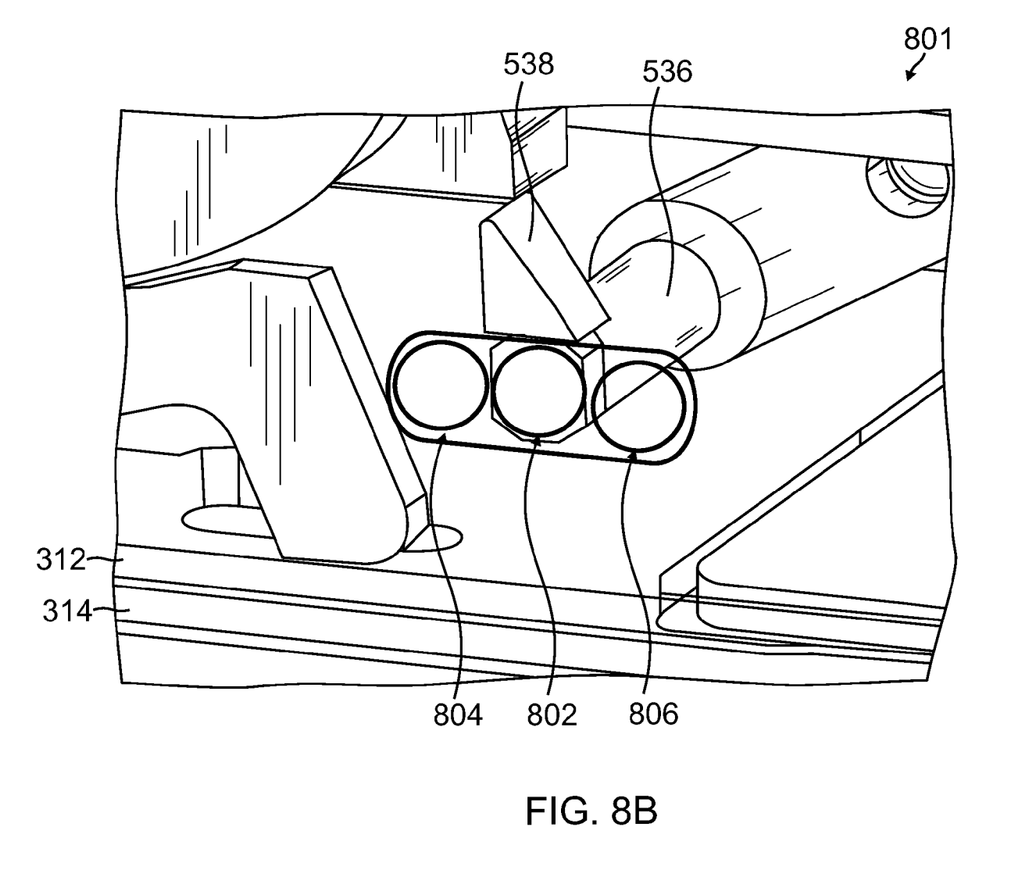

FIGS. 8A and 8B illustrate a catch pin mechanism of a latch 800 and 801, respectively, in accordance with embodiments of the disclosure.

FIG. 8A illustrates portions of latch 102 that interface with handle extension portion 314. Linkage portion of lock hook spring and linkage 546 is coupled to a first end of latch release button 544 at coupling 549. Latch release button 544 is coupled at a second end to a catch pin linkage 548 portion of catch pin 536. Latch release button 544 is pivotally secured to first handle portion 312 at a pivotal coupling 542. Catch pin 536 translates through slotted hole 540.

Double hinged lever 528 may be pivotally secured to first handle portion 312 and latch arm 304 (FIG. 3). Rotation of first handle portion 312 may exert a force on double hinged lever 528 to move latch arm 304 (FIG. 3) toward pin 424 (FIG. 4).

In FIG. 8A, catch pin 536 is shown in a position when lock hook 310 (FIG. 3) is engaged with pin 424. In this regard, catch pin 536 is in a center position and handle catch 538 is in a locked position in contact with catch pin 536 and handle extension portion 314 is secured adjacent to first handle portion 312.

Catch pin 536 translates relative to lock hook 310. In this regard, as lock hook 310 is disengaged from pin 424, catch pin 536 translates away from handle catch 538 allowing handle extension portion 314 to move away from first handle portion 312.

Movement of catch pin 536 along slotted hole 540 provides a positive indication that latch arm 304 is secured or not secured. In this regard, lock hook 310 will not engage with pin 424 if latch hook 306 (FIG. 3) is not engaged with pin 424. Position of lock hook 310 is translated relative to catch pin 536 through coupling 549 of lock hook spring and linkage 546. Thus, if lock hook 310 is not engaged with pin 424, catch pin 536 will not move to a center position. When catch pin 536 is not in the center position, catch pin 536 may not support handle catch 538 and, accordingly, handle extension portion 314. Thus, handle extension portion 314 moves away from first handle portion 312 to provide a positive visual indication to an observer latch 102 is not properly engaged. This positive latch mechanism provides a failsafe approach to insuring a latch is properly engaged.

Further, latch release button 544 disengages lock hook 310 from pin 424 when latch release button 544 is depressed. Catch pin 536 translates away from handle catch 538 when latch release button 544 is depressed to allow handle extension portion 314 to move away from first handle portion 312.

FIG. 8B illustrates three positions of catch pin 536. Catch pin 536 is in the center position (802) when lock hook 310 is engaged with pin 424. In this configuration, handle catch 538 is in contact with catch pin 536 and handle extension portion 314 may be secured adjacent to first handle portion 312.

Catch pin 536 translates to a resting position (806) when lock hook 310 is not engaged with pin 424. In this configuration, catch pin 536 translates away from handle catch 538 allowing handle extension portion 314 to move away from first handle portion 312.

Catch pin 536 translates to a release position (804) when latch release button 544 is depressed. In this configuration, lock hook 310 disengages from pin 424 and catch pin 536 translates away from handle catch 538 allowing handle extension portion 314 to move away from first handle portion 312.

Figure 9:
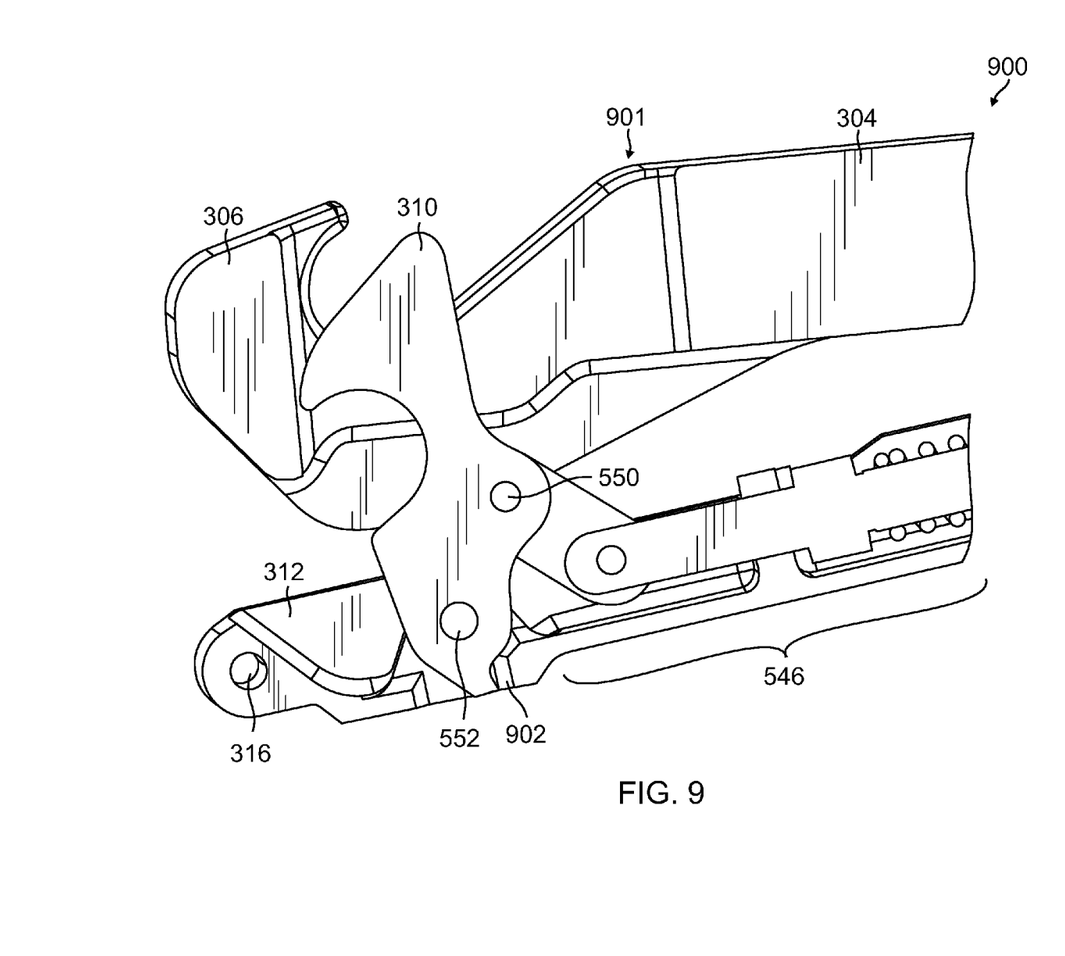
FIG. 9 illustrates a lock hook mechanism of a latch in accordance with an embodiment of the disclosure.

FIG. 9 illustrates a lock hook mechanism of a latch 900 in accordance with an embodiment of the disclosure. In FIG. 9, cutaway 901 shows lock hook 310 connected to first handle portion 312 at lock hook pivotal connection 552. Lock hook spring and linkage 546, connected to lock hook 310 at lock hook attach pin 550, may limit the travel of lock hook 310 relative to latch hook 306 to keep lock hook 310 from contacting latch hook 306. Spring member of lock hook spring and linkage 546 may hold lock hook 310 in a closed (e.g., resting) position when lock hook 310 is not engaged with pin 424. The implementation of lock hook spring and linkage 546 coupling to lock hook 310 allows latch 102 to be adjusted (e.g., preloaded) without requiring additional adjustments to lock hook 310 travel relative to latch hook 306. A cavity 902 is included in first handle portion 312 to guide lock hook 310 travel. Handle extension coupling 316 couples handle extension portion 314 to first handle portion 312.

FIGS. 10A-E illustrate operational perspectives of a latch 1000 in accordance with embodiments of the disclosure. FIG. 10 includes FIGS. 10A, 10B, 10C, 10D and 10E to illustrate latch 102 in operation.

FIGS. 10A, 10B, 10C, 10D and 10E include a first cowl member 1005 with a latch 102 mechanically coupled on first cowl member 1005 and a second cowl member 1006 with a pin 424 mechanically coupled on second cowl member 1006.

Figure 10A:
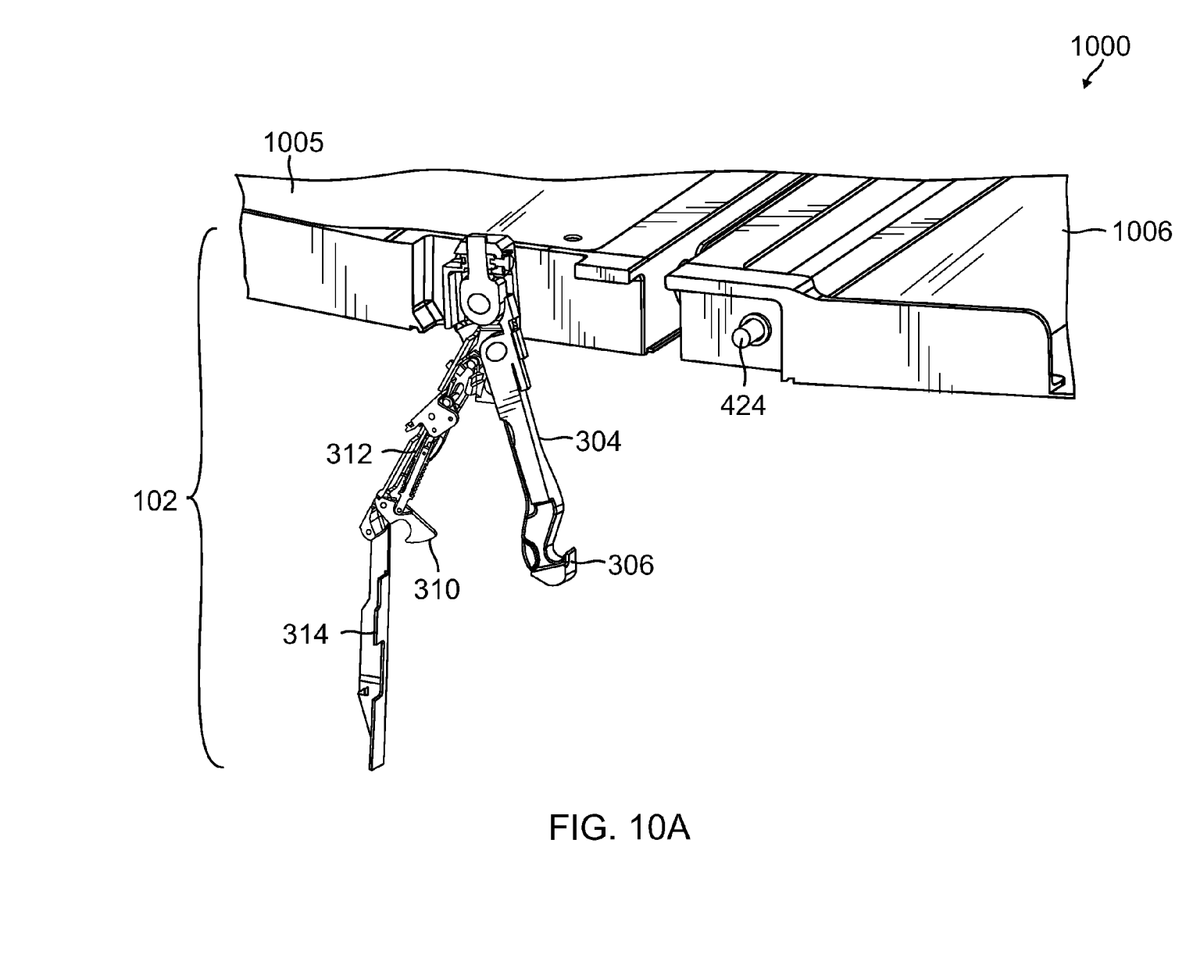
FIGS. 10A-E illustrate operational perspectives of a latch in accordance with embodiments of the disclosure.

FIG. 10A (1000) illustrates latch 102 in an unengaged position. First handle member 312 is in an unsecured (e.g., third) position. Handle extension member 314 is unsecured. Both latch hook 306 and lock hook 310 do not engage pin 424. Latch arm 304 is in a first (e.g., unsecured) position. Handle extension member 314 is moved away from first handle member 312.

Figure 10B:
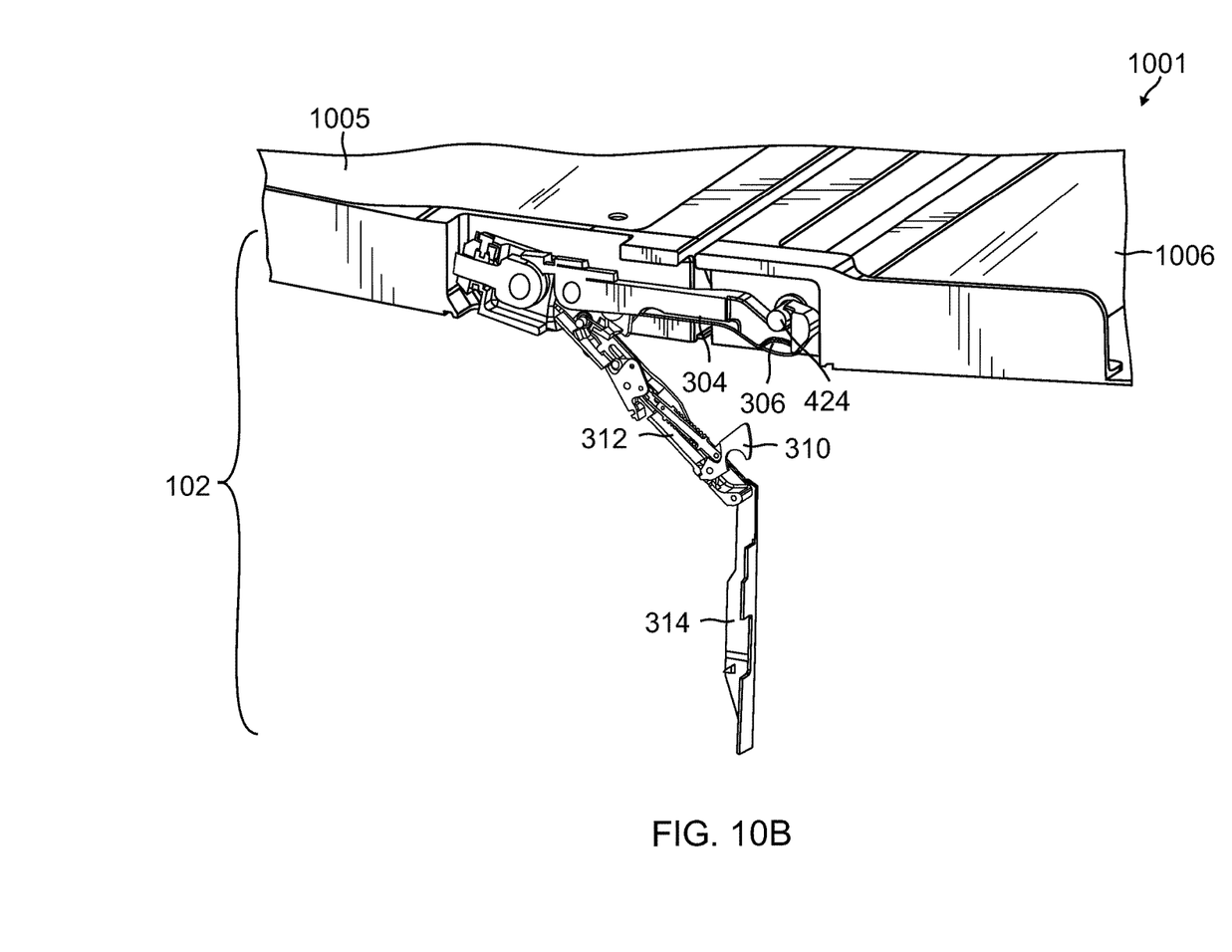

FIG. 10B (1001) illustrates latch 102 in a disengaged position. First handle member 312 is in an unsecured (e.g., third) position. Handle extension member 314 is unsecured. Latch hook 306 is engaged. Lock hook 310 is not engaged. Latch arm 304 is in a second (e.g., secured) position. Handle extension member 314 is moved away from first handle member 312.

Figure 10C:
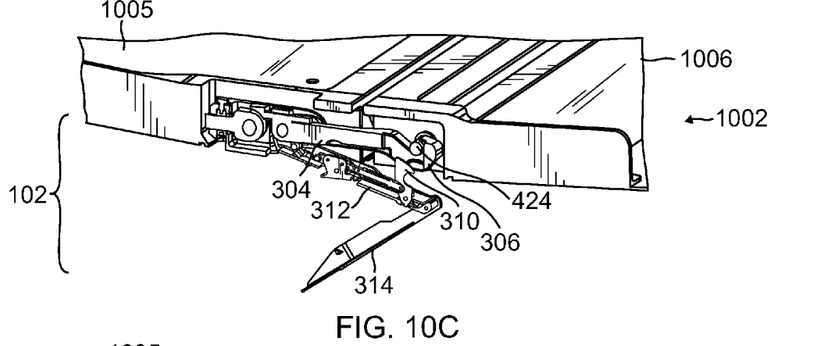

FIG. 10C (1002) illustrates latch 102 in a further disengaged position. First handle member 312 is in an unsecured (e.g., third) position. Handle extension member 314 is unsecured. Latch hook 306 is engaged. Lock hook 310 is not engaged. Latch arm 304 is in a second (e.g., secured)

position. Handle extension member 314 is moved away from first handle member 312.

Figure 10D:
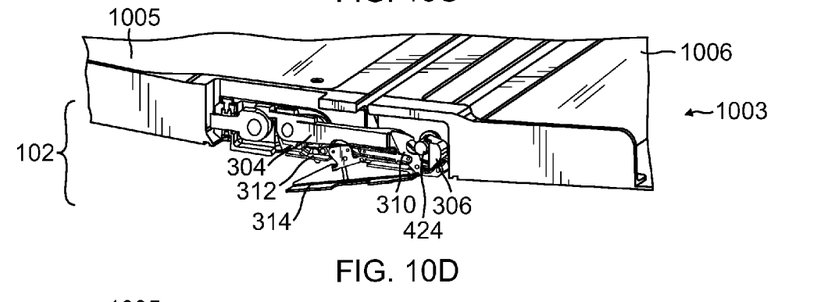

FIG. 10D (1003) illustrates latch 102 in another disengaged position. First handle member 312 is in an unsecured (e.g., third) position. Handle extension member 314 is unsecured. Latch hook 306 is engaged. Lock hook 310 is not engaged. Latch arm 304 is in a second (e.g., secured) position. Handle extension member 314 is moved away from first handle member 312.

Figure 10E:
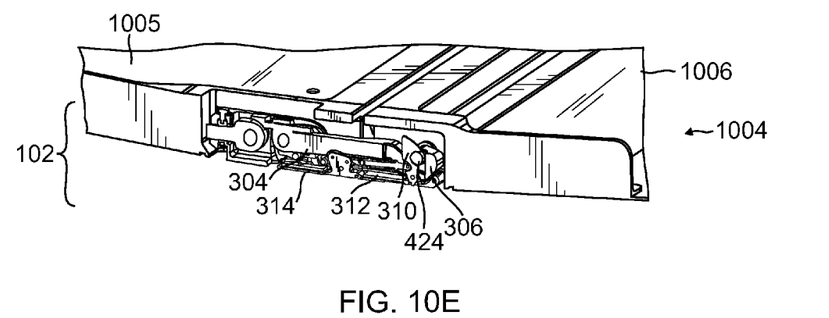

FIG. 10E (1004) illustrates latch 102 in an engaged position. First handle member 312 is in a secured (e.g., second) position. Handle extension member 314 is in a secured (e.g., second) position. Latch hook 306 is engaged. Lock hook 310 is engaged. Latch arm 304 is in a second (e.g., secured) position. Handle extension member 314 is folded in adjacent to first handle member 312.

Embodiments described above illustrate but do not limit the invention. For example, it will be appreciated that, where appropriate, principles applied herein to latches used on aircraft hinged structures can be applied to latching other hinged structures. It should also be understood that numerous modifications and variations are possible in accordance with the principles of the present invention. Accordingly, the scope of the invention is defined only by the following claims.

What is claimed is:

1. An apparatus comprising:
a latch comprising:
a latch arm comprising a first slotted hole and a latch hook configured to engage a pin; and
a bifold handle coupled to the latch arm, the bifold handle comprising a first handle portion and a handle extension portion, wherein the first handle portion comprises a first end coupled to the latch arm and having a lock hook configured to translate through the first slotted hole to engage the pin and a second end coupled to the handle extension portion, wherein the handle extension portion is configured to move adjacent to the first handle portion when the lock hook is engaged with the pin, and the handle extension portion is configured to move away from the first handle portion when the lock hook is not engaged with the pin.

2. The apparatus of claim 1, wherein the first handle portion comprises:
a first spring mechanism configured to limit the travel of the lock hook;
a second spring mechanism configured to apply a force to the handle extension portion to move the handle extension portion relative to the first handle portion when the lock hook is not engaged with the pin; and
a third spring mechanism configured to apply a force to the first handle portion to move the first handle portion relative to the pin when the lock hook is not engaged with the pin.

3. The apparatus of claim 2, wherein the first spring mechanism is configured to hold the lock hook in a forward resting position when the lock hook is not engaged with the pin.

4. The apparatus of claim 1, wherein the handle extension portion comprises a handle catch fixedly disposed on one or more sides of the handle extension portion, the handle catch configured to prevent the handle extension portion from moving relative to the first handle portion when the lock hook is engaged with the pin.

5. The apparatus of claim 4, further comprising:
a catch pin disposed across the first handle portion and coupled to a latch release button, wherein:
the latch release button is coupled to the lock hook;
the catch pin travels along a second slotted hole disposed in the first handle portion and relative to the lock hook;
the handle catch is configured to translate to a locked position;
the catch pin is configured to translate to contact the handle catch in the locked position when the lock hook is engaged with the pin to keep the handle extension portion adjacent to the first handle portion; and
the catch pin is configured to translate away from the handle catch when the lock hook is not engaged with the pin to allow the handle extension portion to move away from the first handle portion.

6. The apparatus of claim 5, wherein the latch release button is configured to disengage the lock hook from the pin when the latch release button is depressed and the catch pin is configured to translate away from the handle catch when the latch release button is depressed to allow the handle extension portion to move away from the first handle portion.

7. The apparatus of claim 1, further comprising an adjustment nut disposed in the latch, configured to apply a selectable preload to the latch by adjusting a position of the latch relative to the pin.

8. The apparatus of claim 1, further comprising a first cowl member, a second cowl member, and the pin, wherein:
the pin is disposed on the second cowl member;
the latch is mechanically coupled to the first cowl member; and
the latch is configured to translate the first cowl member towards the second cowl member when the latch arm engages the pin.

9. An aircraft comprising the latch of claim 1, the aircraft further comprising:
a first cowl member comprising a first cowl member outer surface, wherein the latch is mechanically coupled on the first cowl member;
a second cowl member comprising a second cowl member outer surface; and
the pin disposed on the second cowl member, wherein the latch is configured to translate the first cowl member towards the second cowl member when the latch arm of the latch engages the pin and at least a portion of the bifold handle is configured to be flush with the first cowl member outer surface and/or the second cowl member outer surface when the lock hook is engaged.

10. The apparatus of claim 9, wherein a surface of the handle extension portion is configured to be flush with the first cowl member outer surface and/or the second cowl member outer surface when the lock hook is engaged and the handle extension portion is configured to move away from the first cowl member outer surface when the lock hook is not engaged.

11. A method of using a latch, the method comprising:
moving a latch arm from a first position to a second position;
securing the latch arm at the second position by engaging the latch arm to a pin;
moving a first handle member, coupled to the latch arm, from a third position to the second position;
securing the first handle member at the second position by engaging a lock hook, coupled to the first handle member, to the pin, wherein securing the first handle member comprises moving a catch pin, coupled to the lock hook, from a resting position to a center position responsive to engaging the lock hook to the pin;

moving a handle extension member, coupled to the first handle member, into a secured position adjacent to the first handle member;

securing the handle extension member at the secured position by the catch pin disposed at the center position; and wherein the handle extension member moves away from the first handle member when the catch pin moves from the center position to the resting position responsive to disengaging the lock hook from the pin.

12. The method of claim 11, wherein the latch arm comprises a latch hook and securing the latch arm at the second position comprises pulling the latch hook over the pin.

13. The method of claim 11, wherein the securing the first handle member comprises pushing the lock hook over the pin.

14. The method of claim 11, wherein securing the handle extension member by the catch pin comprises:

moving, with a handle catch, the catch pin from the center position to the resting position;

moving the handle catch from an unengaged position to an engaged position; and moving the catch pin from the resting position to the center position.

15. The method of claim 11, further comprising:

turning a nut disposed in the latch to adjust a preload of the latch arm.

16. The method of claim 11, further comprising:

drawing together, with the latch arm, a first panel and a second panel.

17. The method of claim 11, further comprising unsecuring the latch, wherein unsecuring the latch comprises:

moving the handle extension member from the secured position into an unsecured position;

unsecuring the first handle member by disengaging the lock hook from the pin;

moving the first handle member away from the second position;

unsecuring the latch arm by disengaging the latch arm from the pin; and moving the latch arm away from the second position.

18. The method of claim 17, wherein unsecuring the latch further comprises:

depressing a latch release button, wherein depressing the latch release button moves the catch pin to a release position; and wherein the handle extension member moves away from the first handle member when the catch pin moves to the release position.

19. The method of claim 11, wherein the moving the first handle member comprises rotating the first handle member and the moving the handle extension member comprises rotating the handle extension member.

20. The method of claim 11, further comprising holding, by a first spring mechanism, the lock hook in a forward resting position when the lock hook is not engaged with the pin.

* * * * *